Oct. 30, 1951 W. G. HADDRELL 2,573,014
FILM EDITING KIT
Filed Nov. 6, 1946

Inventor:
Walter G. Haddrell
By Fisher & Christen,
Attorneys.

Patented Oct. 30, 1951

2,573,014

UNITED STATES PATENT OFFICE 2,573,014

FILM EDITING KIT

Walter G. Haddrell, Saltville, Va.

Application November 6, 1946, Serial No. 708,089

5 Claims. (Cl. 312—20)

This invention is a film editing kit, for use particularly by the amateur photographer in cutting, titling and assembling motion picture film.

The present invention presents certain advantages over the subject matter of my application "Film Editing Equipment" Ser. No. 677,733, filed June 19, 1946.

The editing of motion picture film requires the use of supply and take-up reels mounted a considerable distance apart, with cutting, splicing and viewing devices and the like mounted between the two reels, in convenient position for the operator. Such equipment, if mounted on a single rigid base, would be from two to three feet long and somewhat difficult to store away free from dust when not in use and to carry from place to place.

The principal object of the invention is to provide a film editing kit mounted on a base made in separable parts, which, when separated, can be stored or carried in a container of convenient size, and kept free from dust or breakage.

Another object of the invention is to provide a film editing kit which can be removed from its carrying or storage container and quickly assembled in operative position.

Another object of the invention is to form one wall of the container as an editing tray, by providing such wall with a series of numbered or lettered compartments or cells or other means for holding lengths or coils of film during the film editing operation. With the numbered or lettered cells or other holders, a suitable scene index is provided, so that the operator can keep track of the several lengths of film and join them up in proper sequence.

The invention comprises further features of construction and operation which will be described in connection with the accompanying drawings, wherein.

Figure 1:
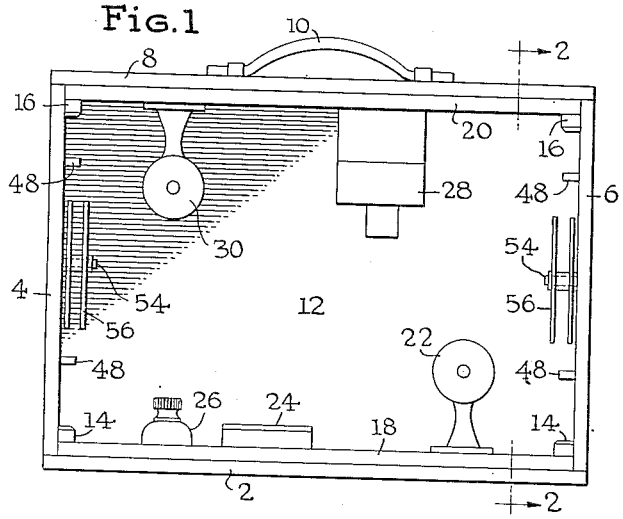
Fig. 1 is a front view of the film editing kit, in its container, with the front removed.
Figure 2:
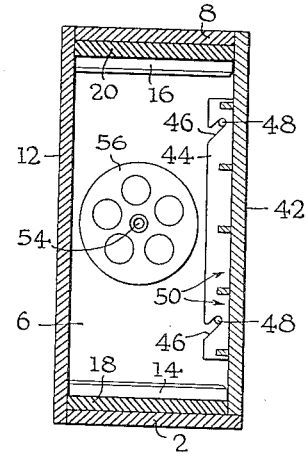
Fig. 2 is a cross section of Fig. 1, taken on the line 2—2.
Figure 3:
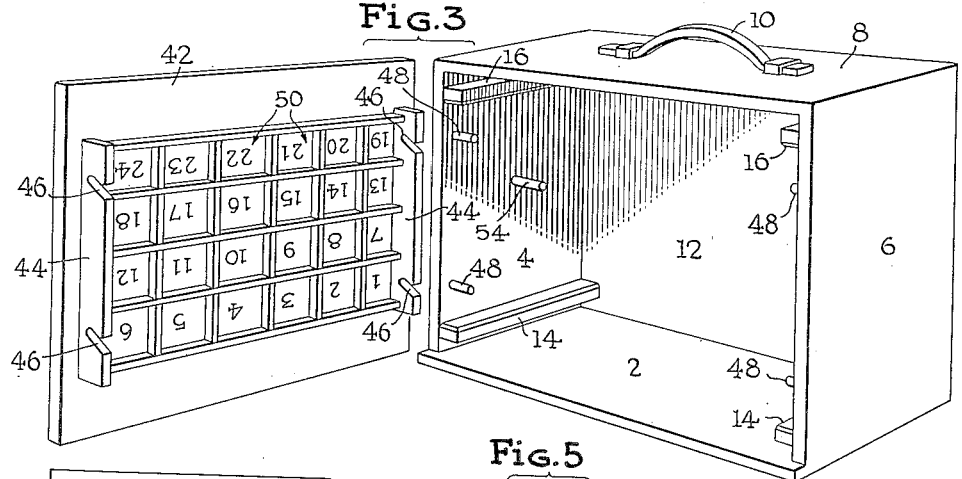
Fig. 3 is a perspective view of the container and front cover.

Referring now to these drawings, the editing kit comprises a container having a bottom 2, ends 4 and 6, top 8, having a carrying handle 10, and back 12, all preferably fixed in position. Ends 4 and 6 are each provided with a lower positioning cleat or the like 14, and with an upper positioning cleat 16, spaced a little from the bottom and top of the container, respectively.

Film editing devices are mounted on base boards 18 and 20, which boards are removable from the container. Board 18 has mounted thereon a reel holder 22, splicer 24 and a recess for holding a bottle 26 of film solvent. Board 20 has mounted thereon a viewer 28 and reel holder 30. Boards 18 and 20 are of about the same size, and are detachably coupled together in end to end relation.

Any type of detachable coupling could be used, such for example, as spring hooks 32, mounted in the end of board 20, and spring hooks 34, the ends of which are in recesses 36 in the adjacent end of board 18. Hooks 32 and 34 are of sheet metal, so that when interengaged, they will hold the boards 18 and 20 in end to end relation and may be readily uncoupled by raising the adjacent ends to disengage the hooks.

Another way of coupling the boards is to provide one of them, such as 18, with an end groove 38, and the other with a tongue 40 adapted to slip endwise with such groove.

The boards could also be detachably joined by other well known means, such as dowels in one board fitting into holes in the other board, by dovetail joints, etc.

The container is provided with a front 42, detachably coupled to the container for ready removal, as by angle strips 44 provided with diagonal slots 46, adapted to engage with studs 48 on the inner walls of ends 4 and 6.

Front 42 is provided with a series of numbered or lettered cells or compartments 50, formed by intersecting vertical and horizontal strips, which strips strengthen and stiffen wall 42, the cells serving to hold coils of film. Other means for holding the strips or coils of film could be used, such for example, as spring clips.

A scene or film index 52 is provided, for indicating the cell or compartment or other type of holder in which particular lengths of film are stored.

The end walls 4 and 6 may be provided with spindles 54 for carrying one or more film reels 56.

When in disassembled position, board 18 containing the solvent bottle 26, is in the container and held in place by cleats 14. Board 20 is upside down, and held in place by cleats 16. The kit is closed by the front 42 and is carried by handle 50, and makes a compact and readily portable package. The kit is readily assembled by removing front 42 and removing boards 18 and 20 and coupling them together in end to end relation. The numbered or lettered cells or holders, in cooperation with scene index 52, are very useful, in the film editing operations.

Figures 4, 5, 6, 7, 8:
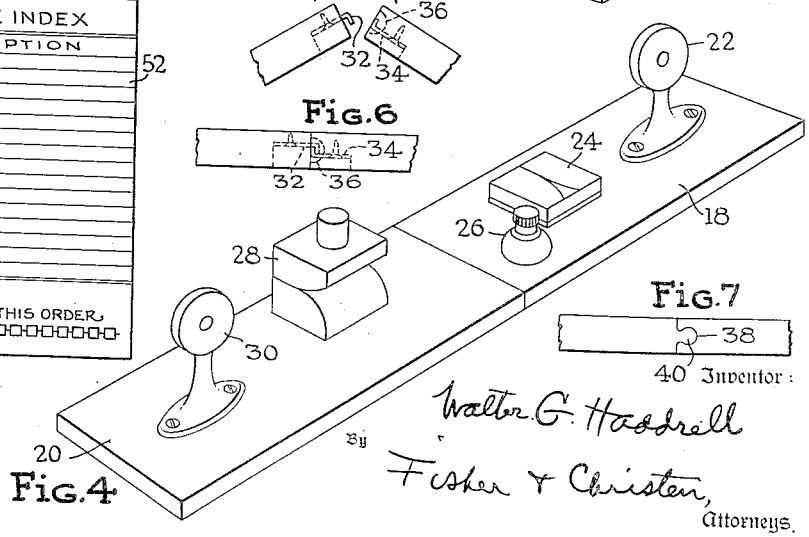
Fig. 4 is a perspective view of the film editing apparatus, removed from the container, in operative position.
Fig. 5 is a side view of a joint for the base boards, before coupling.
Fig. 6 is a side view of the joint for the base boards, in coupled position.
Fig. 7 is a side view of a modified joint for the base boards.
Fig. 8 shows a scene index for keeping track of the lengths of film being handled by the film editor.

There is thus provided a compact and readily portable film editing kit, which can be easily disassembled and packed in its container and as readily removed and set up in operative position. The filing cells or holders 50, in association with the index, are of great help to the operator, in keeping track of the various strips of film, so that he may assemble them in proper sequence.

Where the user desires, in the course of editing or otherwise, simply to rewind reels of film, he may do so with the boards placed as shown in Fig. 4, or he may simply transpose the boards and, if desired, couple them with a duplicate coupling, so that the left hand end of board 20 abuts against the right hand end of board 18, thereby bringing the reel holders 22 and 30 fairly close together with a clear space between, eliminating the necessity for passing the film through, over or around the viewer, splicer, etc.

It should be understood that the devices used in editing, such as the holders for the supply and take-up reels, the viewer, splicer, etc., are standard items, and that the combination of the present invention could be marketed with or without such items.

While the invention has been described in some detail, it should be understood that the invention is not limited to the details shown, but may be carried out in other ways.

I claim:

1. A film editing kit, comprising a container, a pair of base boards each adapted to serve as a base for film editing devices, said base boards being removable from the container, means within the container, cooperating with said base boards, for storing the base boards therein, and means for detachably coupling the base boards in end to end relation, when removed from the container.

2. A film editing kit, comprising a container having end walls, a base board adapted to serve as a base for film editing devices, a second base board adapted to serve as a base for film editing devices, both said boards being removable from the container, and means within the container, positioned on the inside end walls of the container, adjacent the upper and lower edges thereof, cooperating with said base boards, for storing said boards in the container, in parallel relation, with the second board upside down.

3. A film editing kit, comprising a container, having fixed top, bottom and end walls, a pair of base boards each carrying a plurality of film editing devices, horizontal cleats, carried by the end walls and cooperating with said base boards, for detachably holding said base boards in the container in parallel relationship, and means for coupling the base boards together in end to end relation when removed from the container.

4. A film editing kit, comprising a container, a pair of base boards, each adapted to serve as a base for film editing devices, said base boards being removable from the container, and means within the container, cooperating with said base boards, for storing the base boards therein, said container having a removable wall provided with a plurality of intersecting vertically and horizontally extending strips, serving to stiffen and strengthen said wall, whereby cells are formed adapted to hold coils of film.

5. A film editing kit, comprising a container, a pair of base boards each adapted to serve as a base for film editing devices, said base boards being removable from the container, means within the container, cooperating with said base boards, for storing the base boards therein, means for detachably coupling the base boards in end to end relation, when removed from the container, said container including a removable wall, and means for detachably holding said wall in place in the container.

WALTER G. HADDRELL.

REFERENCES CITED

The following references are of record in the file of this patent:

UNITED STATES PATENTS

| Number | Name | Date |
|---|---|---|
| 822,875 | Topham | June 5, 1906 |
| 1,507,760 | Sutherland | Sept. 9, 1924 |
| 1,715,725 | Tomoda | June 4, 1929 |
| 1,855,943 | Day | Apr. 26, 1932 |
| 2,166,837 | Ash | July 18, 1939 |
| 2,218,256 | Bechtel | Oct. 15, 1940 |

FOREIGN PATENTS

| Number | Country | Date |
|---|---|---|
| 432,919 | France | July 18, 1911 |